（12）United States Patent
Lee (10) Patent No.: US 8,622,093 B2
(45) Date of Patent: Jan. 7, 2014

(54) VIBRATION-RESISTANT REINFORCED CONCRETE WATERTIGHT PIPE AND METHOD OF MANUFACTURING THE SAME

(75) Inventor: Jung Suk Lee, Seoul (KR)

(73) Assignees: Jung Suk Lee (KR); Sun-Am R&D Co., Ltd. (KR)

( * ) Notice: Subject to any disclaimer, the term of this patent is extended or adjusted under 35 U.S.C. 154(b) by 547 days.

(21) Appl. No.: 13/003,637

(22) PCT Filed: Jul. 9, 2009

(86) PCT No.: PCT/KR2009/003765
§ 371 (c)(1),
(2), (4) Date: Jan. 11, 2011

(87) PCT Pub. No.: WO2010/005248
PCT Pub. Date: Jan. 14, 2010

(65) Prior Publication Data
US 2011/0108151 A1 May 12, 2011

(30) Foreign Application Priority Data

Jul. 11, 2008 (KR) .................. 10-2008-0067749

(51) Int. Cl.
| F16L 9/22 | (2006.01) |
| F16L 9/00 | (2006.01) |
| F16L 11/00 | (2006.01) |
| F16L 49/00 | (2006.01) |
| F16L 13/00 | (2006.01) |
| F16L 13/02 | (2006.01) |
| F16L 15/02 | (2006.01) |
| F16L 27/12 | (2006.01) |
| F16L 39/04 | (2006.01) |
| F16L 47/00 | (2006.01) |

(52) U.S. Cl.
USPC ........... 138/155; 138/109; 138/175; 138/176; 285/230; 285/286.1; 285/288.1; 285/288.9; 285/291.1

(58) Field of Classification Search
USPC .................. 138/109, 110, 155, 174–176; 285/114–116, 230, 285.1, 286.1, 285/286.2, 288.1–288.11, 291.1–291.4, 285/293.1; 264/279.1
See application file for complete search history.

(56) References Cited

U.S. PATENT DOCUMENTS

| 515,627 A * | 2/1894 | Sykes ........................... 285/231 |
| 912,318 A * | 2/1909 | McMahon ................. 285/290.3 |

(Continued)

FOREIGN PATENT DOCUMENTS

| JP | 55-82587 | 6/1980 |
| JP | 4-46290 | 4/1992 |

(Continued)

*Primary Examiner* — Paul R Durand
*Assistant Examiner* — Matthew Lembo
(74) *Attorney, Agent, or Firm* — Cantor Colburn LLP (57) ABSTRACT

A vibration-resistant reinforced concrete watertight pipe, at opposite ends of which coupling units formed of a separate material are formed, and a method of manufacturing the same are provided. The vibration-resistant reinforced concrete watertight pipe includes a reinforced concrete pipe having a reinforcement mat, which is assembled with longitudinal reinforcements and transverse reinforcements, disposed in a concrete layer, and a convexity coupling part and a concavity coupling part that are coupled to opposite ends of the reinforced concrete pipe and have coupling ridges and coupling furrows respectively. Here, the coupling part and the concavity coupling part are formed of a synthetic resin, which is different in physical properties from the reinforced concrete pipe, and have the same shape and thickness as the reinforced concrete pipe. Each of the convexity coupling part and the concavity coupling part has a metal core installed therein to increase a coupling strength.

9 Claims, 13 Drawing Sheets

(56) References Cited

U.S. PATENT DOCUMENTS

| | | | |
|---|---|---|---|
| 1,003,309 A * | 9/1911 | Wilson | 285/290.2 |
| 1,008,745 A * | 11/1911 | Smith | 285/290.2 |
| 1,132,137 A * | 3/1915 | Weston | 285/290.3 |
| 1,158,416 A * | 10/1915 | Boyle | 285/119 |
| 1,351,895 A * | 9/1920 | Dillon | 285/332 |
| 1,607,415 A * | 11/1926 | Trammell | 285/22 |
| 1,609,660 A * | 12/1926 | Phelps | 285/290.3 |
| 2,488,245 A * | 11/1949 | Smith | 277/621 |
| 2,698,193 A * | 12/1954 | Kennison | 277/625 |
| 3,059,941 A * | 10/1962 | Kaynor et al. | 277/603 |
| 3,217,077 A * | 11/1965 | Cocke | 264/256 |
| 3,228,425 A * | 1/1966 | Pacella | 138/176 |
| 3,289,704 A * | 12/1966 | Nicosia | 138/155 |
| 4,583,771 A * | 4/1986 | Wasterberg | 285/230 |

FOREIGN PATENT DOCUMENTS

| | | |
|---|---|---|
| JP | 08-200569 | 8/1996 |
| JP | 2005-028768 | 2/2005 |
| KR | 2000-0019722 | 11/2000 |

* cited by examiner

Fig. 1

*Prior Art*

Fig. 3

*Prior Art*

Fig. 13

VIBRATION-RESISTANT REINFORCED CONCRETE WATERTIGHT PIPE AND METHOD OF MANUFACTURING THE SAME

TECHNICAL FIELD

The present invention relates, in general, to a vibration-resistant reinforced concrete watertight pipe and a method of manufacturing the same and, more particularly, to a vibration-resistant reinforced concrete watertight pipe, at opposite ends of which joint means of high-strength synthetic resin or recycled synthetic resin are provided, and a method of manufacturing the same.

BACKGROUND ART

As is generally known in the art, reinforced concrete pipes are classified by the manufacturing method into centrifugal reinforced concrete pipes and vibrated and rolled (VR) reinforced concrete pipes. The reinforced concrete pipes are produced from a no-slump concrete mixture by a vibrating and compressing method, and are used as drainage pipes, water supply pipes, agricultural water pipes, industrial water pipes, and so on.

Figure 1:
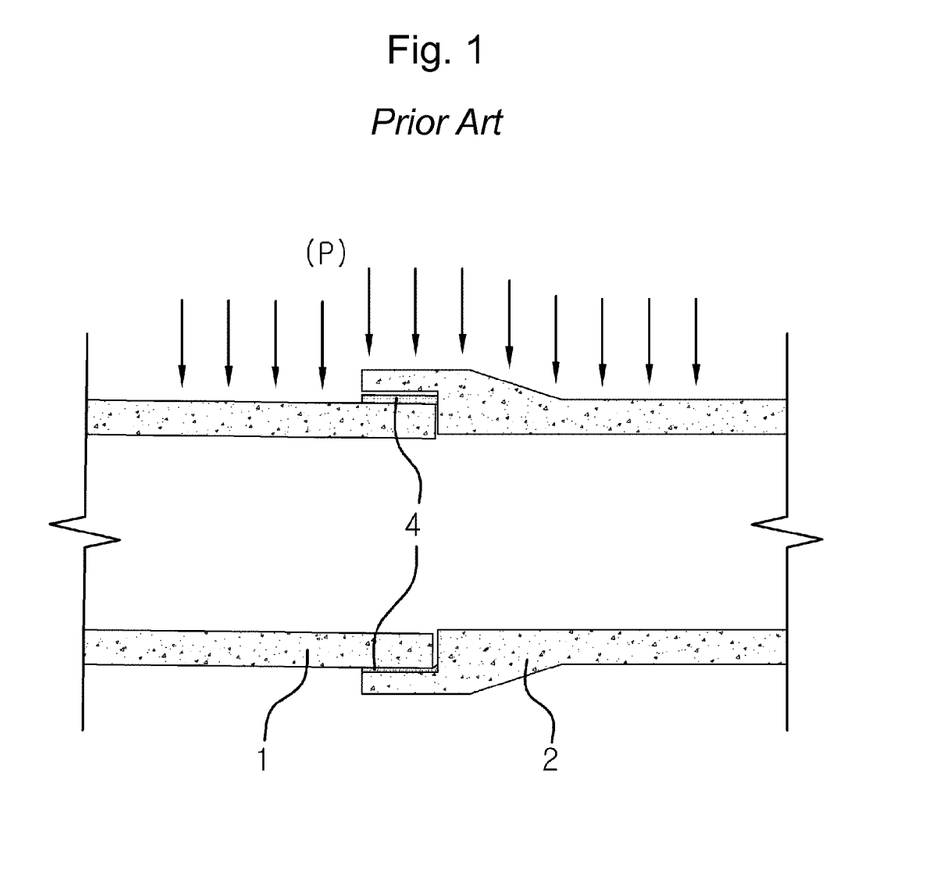
FIG. 1 is a view that explains the problems of a conventional reinforced concrete watertight pipe.

As shown in FIG. 1, in the reinforced concrete pipes, the gap of a joint or a seam connected in a collar type or a socket type is filled with a filler such as composition mortar. However, the filler falls out of the gap, and thus it is difficult to keep the joint watertight. For this reason, a rubber ring 4 is used as a primary joining material for joining connector parts 1 and 2 of the watertight reinforced concrete pipes that have recently been developed, and composition mortar as a secondary joining material is injected between the connector parts, so that the pipes withstand high hydraulic pressure. However, differential settlement of a pipe line occurs due to compaction of the ground, insufficient foundation work, or careless construction practices.

Meanwhile, to prevent a tremendous concentrated load P such as that from soil pressure above the pipe, the load of vehicles, and a dead load of the pipe from being directly applied to the rubber ring 4 between the pipes, another method of simultaneously injecting the rubber ring 4 and the composition mortar as the secondary joining material is used, so that the rubber ring 4 is responsible for handling only the hydraulic pressure, while the composition mortar takes charge of the concentrated load P. However, due to either the breakdown of the injected composition mortar for failing to withstand the concentrated load P or the differential settlement, it is impossible to accomplish the desired purpose of external water flowing into the pipes or internal water flowing out of the pipes. Particularly, a large quantity of external water, i.e. infiltration or inflow, is generated. Recently, pipe maintenance work has been carried out on a large scale for the purpose of protecting the environment and improving the quality of water.

Figure 2:
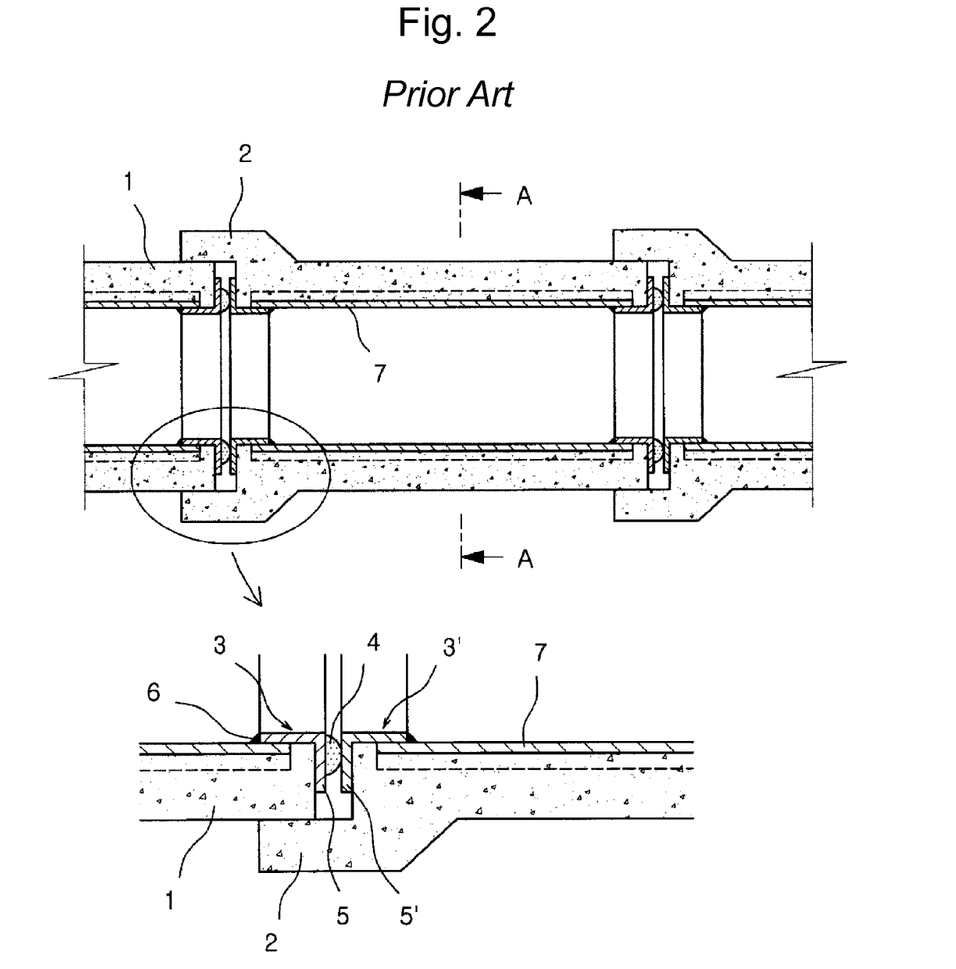
FIG. 2 is a cross-sectional view showing the construction of Cited Invention 1.

To solve this problem, many inventions have been proposed, representative examples of which are Korean Utility Model Registration No. 333394, entitled "THE CONNECTING STRUCTURE OF THE CONCRETE PIPES" (hereinafter, referred to as "Cited Invention 1") and Korean Patent No. 726736, entitled "FIXING CONSTRUCTURE OF DRAINAGE" (hereinafter, referred to as "Cited Invention 2"). As for the construction of each invention, Cited Invention 1 is constructed, as in shown in FIG. 2, so that cross section L-shaped circular angles 3 and 3' are inserted into a spigot part 1 and a socket part 2 of the concrete pipes connected by socket connection respectively, and a ring-shaped sealing member 4 is interposed between the circular angles 3 and 3'. Thereby, the socket part 2 takes charge of a concentrated load P such as soil pressure, and the ring-shaped sealing member 4 takes charge of watertightness. However, Cited Invention 1 fails to overcome the problem of the conventional concrete pipe, i.e. the breakdown of the socket part 2. Due to the breakdown of the socket part 2 and the twisting of the pipe, watertightness is easily broken.

Figure 3:
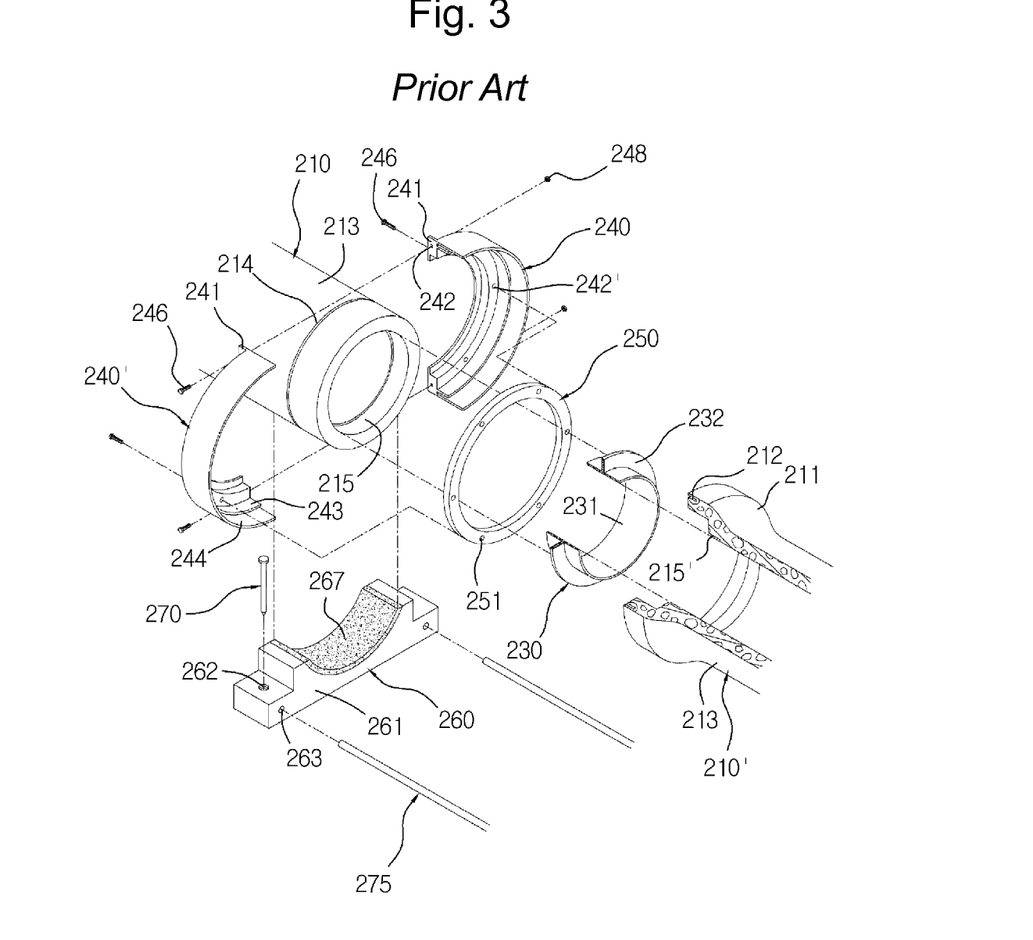
FIG. 3 is an exploded perspective view showing the construction of Cited Invention 2.

Further, as shown in FIG. 3, Cited Invention 2 includes sewer pipes 210 and 210', wherein the sewer pipe 210' includes a socket part 211 that is provided with a slit 212, and a plurality of embedded nuts 222 that are provided adjacent to the slit 212, wherein the sewer pipe 210 includes a circular pipe part 213 that is provided with a fixing groove 214 in an outer circumference thereof, and wherein the sewer pipes 210 and 210' include inner end steps 215 and 215' that are formed in inner circumferences of the socket part 211 and the circular pipe part 213; an inner seal 230 having a circular ring 231 that is in close contact with the inner end steps and an insert part 232 that is integrally formed with the circular ring 231 and protrudes from the middle of an outer circumference of the circular ring 231 at a right angle; coupling rings 240 and 240' that are inserted into the fixing groove 214 of the sewer pipe 210, are fixed to the socket part 211 of the other sewer pipe 210', are coupled by nuts 248 and first bolts 246 passing through fastening holes 242 of coupling flanges 241, have external protection parts 244 formed outside slits 243 and making close contact with an outer surface of the socket part 211, are provided with fastening holes 242' through which second bolts 246 pass and then are fastened to the embedded nuts 222, and are formed as a set in two; a packing 250 that is located inside the coupling rings 240 and 240', has holes 251 through which the second bolts 246 pass in a horizontal direction, and are fixed in close contact with an end face of the socket part 211; and a bottom support 260 that is installed in close contact with the outer circumference of the circular pipe parts 213 of the sewer pipes 210 and 210', has a rubber pad 267 attached to a round face of an arcuate body 261 thereof, is provided with anchor holes 262, through which anchors 270 pass, and connecting holes 263, into which connecting rods 275 are inserted, in vertical and horizontal directions respectively, so as to prevent arbitrary motion of the sewer pipes. With this construction, the problem of Cited Invention 1 is solved. However, Cited Invention 2 has disadvantages in that its connection construction is complicated, that many parts are used to inevitably increase the cost of production, and that a constructing process is complicated and requires much time.

DISCLOSURE

Technical Problem

Accordingly, the present invention has been made in an effort to solve the problems occurring in the related art, and an object of the present invention is to provide a vibration-resistant reinforced concrete watertight pipe, which has coupling means precisely formed of a high-strength or recycled synthetic resin so as to be able to prevent damage to opposite ends of the reinforced concrete watertight pipe, provide excellent watertightness, minimize the influence of a concentrated load, and easily connect the reinforced concrete watertight pipes to each other, and a method of manufacturing the same.

Technical Solution

In order to achieve the above object, according to one aspect of the present invention, there is provided a vibration-resistant reinforced concrete watertight pipe, which comprises: a reinforced concrete pipe having a reinforcement mat, which is assembled with longitudinal reinforcements and transverse reinforcements, disposed in a concrete layer; and a coupling means made up of a convexity coupling means and a concavity coupling means that are coupled to opposite ends of the reinforced concrete pipe and have coupling ridges and coupling furrows respectively. Here, the convexity coupling means and the concavity coupling means are formed of a material having physical properties different from those of the reinforced concrete pipe, and have shape and thickness identical to those of the reinforced concrete pipe. The convexity coupling means and the concavity coupling means are required to be precisely formed of a high-strength or recycled synthetic resin in order to secure watertightness, and each have a metal core installed therein so as to increase durability, vibration resistance, and coupling strength.

According to another aspect of the present invention, there is provided a method of manufacturing a vibration-resistant reinforced concrete watertight pipe, which comprises: a process of preparing a reinforced concrete pipe by sequentially performing a process of installing a form around a reinforcement mat having longitudinal reinforcements and transverse reinforcements, a process of injecting concrete into the form, and a process of heating and rotating the entire form to cure the concrete with the reinforcement mat disposed in place by centrifugal force; a process of forming a convexity coupling means and a concavity coupling means, which includes a process of inserting metal cores into respective molds, a process of filling a fused resin into a cavity of each mold under high pressure, and a process of cooling the resin and removing each mold; a process of fixing the convexity coupling means and the concavity coupling means to opposite ends of the reinforcement mat; and a process of sequentially performing a process of installing another form around the fixed result and another curing process similar to that used in the process of preparing the reinforced concrete pipe, or which comprises: a process of preparing a reinforced concrete pipe by sequentially performing a process of installing a form around a reinforcement mat having longitudinal reinforcements and transverse reinforcements, a process of injecting concrete into the form, and a process of heating and rotating the entire form to cure the concrete with the reinforcement mat held in place by centrifugal force; a process of fixing extension bars of each metal core to the reinforcement mat protruding toward opposite ends of the reinforced concrete pipe; and a process of forming a convexity coupling means and a concavity coupling means, which includes a process of installing a mold for forming the coupling means so as to surround the cores and the opposite ends of the reinforcement mat and to enable the pipes to be connected in series, a process of filling a fused resin into a cavity of the mold under high pressure, a process of cooling the resin, and a process of removing the mold.

Advantageous Effects

According to the present invention, coupling means precisely formed of a high-strength or recycled synthetic resin are provided at opposite ends of the reinforced concrete pipe, so that the vibration-resistant reinforced concrete watertight pipe is highly resistant to deformation and a concentrated load. Since the coupling means are formed of a synthetic resin having high resistance to brittleness and good flexibility, the vibration-resistant reinforced concrete watertight pipe shows excellent watertightness and is not susceptible to being damaged by external shocks. Thus, the vibration-resistant reinforced concrete watertight pipe can overcome conventional problems, and recycle wasted synthetic resin. Further, the vibration-resistant reinforced concrete watertight pipe is easily manufactured and constructed, so that it can be installed within a short time at a low cost, and is easy to perform maintenance on.

Particularly, a method of connecting the vibration-resistant reinforced concrete watertight pipes can be visually checked, and after making the connection, the position of the watertight pipes cannot be changed. Thus, a sagging phenomenon that, after the pipes are connected as in a known socket connection method, a connected portion becomes loose to generate a gap due to soil pressure, does not occur. The vibration-resistant reinforced concrete watertight pipe can avoid the inconvenience of reconstruction, provide an easy watertight test, and secure high watertightness.

DESCRIPTION OF SYMBOLS OF THE MAIN PARTS IN THE DRAWINGS

| | |
|---|---|
| 10: reinforced concrete pipe | 20: reinforcement mat |
| 21: longitudinal reinforcement | |
| 22: transverse reinforcement | |
| 30: convexity coupling means | 31: coupling ridge |
| 32: protrusion | |
| 40: concavity coupling means | 41: coupling furrow |
| 42: groove | 50: core |
| 51: extension bar | 52: rib |

| | |
|---|---|
| 53: anchor | 60: recess |
| 61: buffer groove | 70: watertight ring |
| 71: ring insertion groove | |

MODE FOR INVENTION

Reference will now be made in greater detail to exemplary embodiments of the invention with reference to the accompanying drawings.

Figure 4:
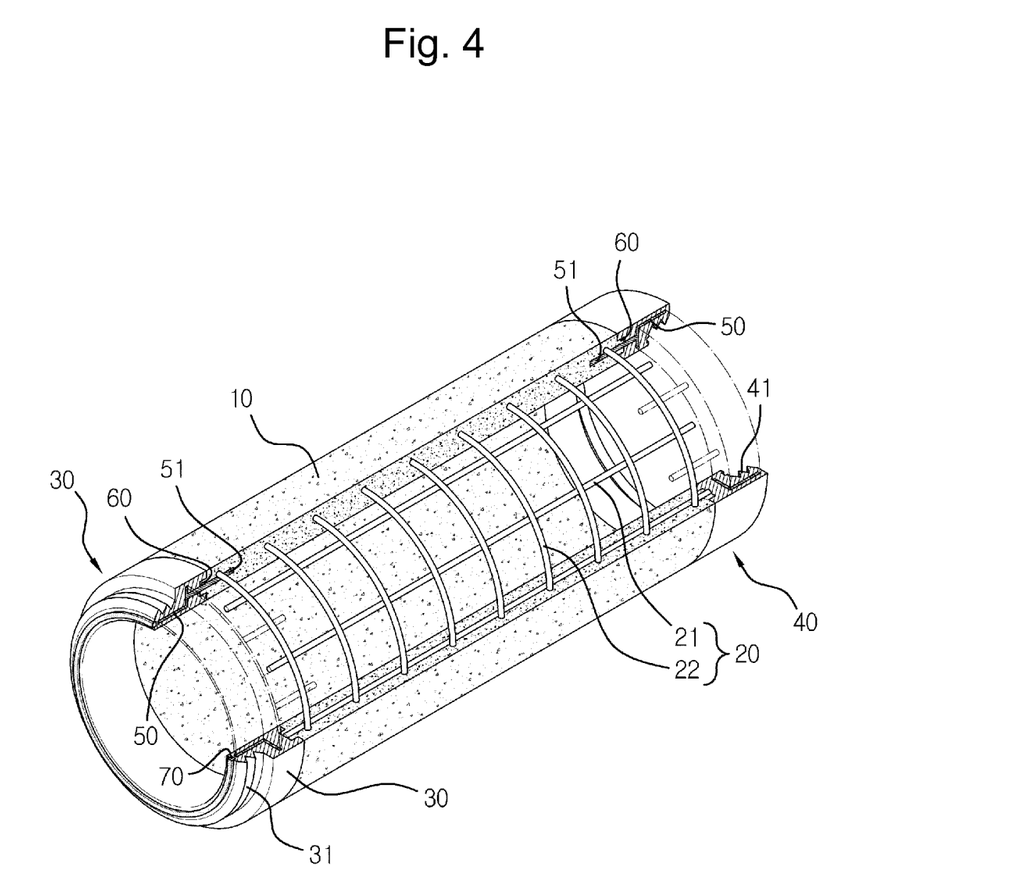
FIG. 4 is a perspective view illustrating a vibration-resistant reinforced concrete watertight pipe according to an exemplary embodiment of the present invention.

FIG. 4 illustrates a vibration-resistant reinforced concrete watertight pipe according to an exemplary embodiment of the present invention.

Figure 7:
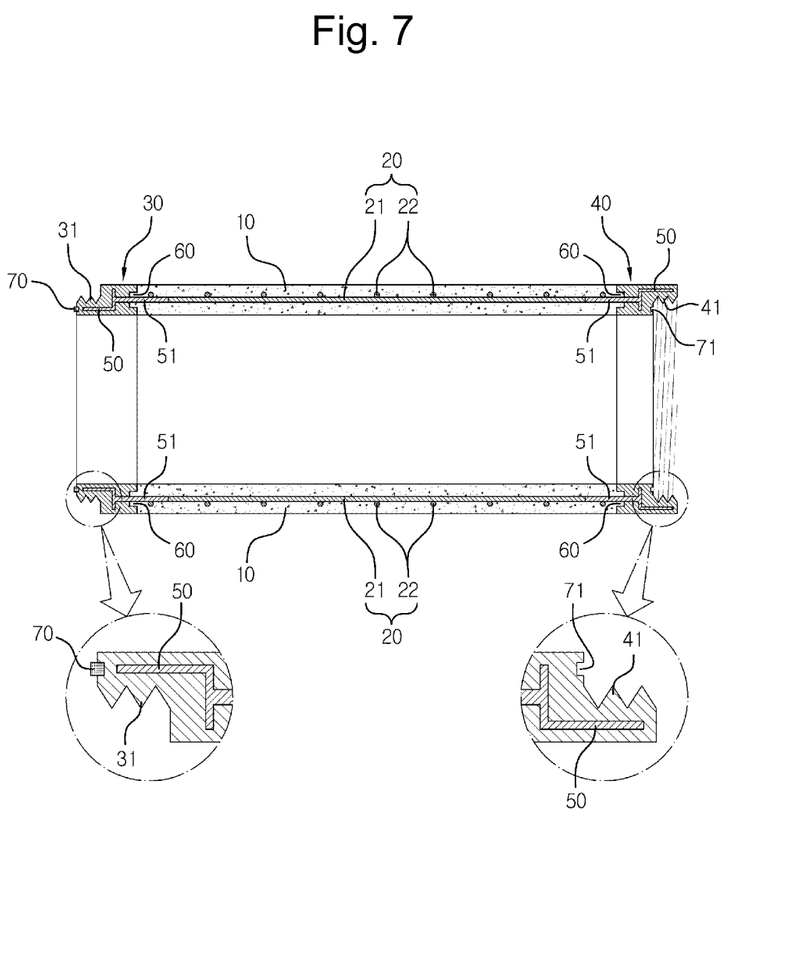
FIGS. 7, 8 and 9 are cross-sectional views illustrating a vibration-resistant reinforced concrete watertight pipe according to an exemplary embodiment of the present invention.
Figure 8:
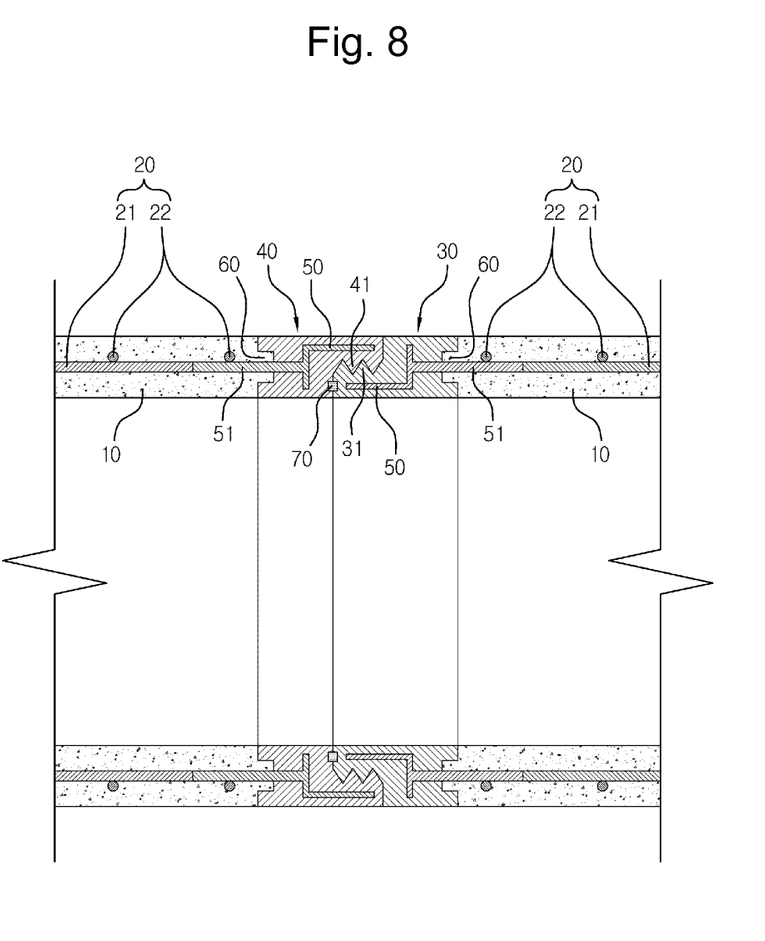

As can be seen from FIG. 4, the present invention is directed to provide a vibration-resistant reinforced concrete watertight pipe, which includes: a reinforced concrete pipe 10 having a reinforcement mat 20, which is assembled with longitudinal reinforcements 21 and transverse reinforcements 22, disposed in a concrete layer; and a convexity coupling means 30 and a concavity coupling means 40 that are formed at opposite ends thereof, are formed of a high-strength synthetic resin or a recycled synthetic resin, which is different in physical properties from the reinforced concrete pipe, and which have the same shape and thickness as the reinforced concrete pipe. As shown in FIGS. 7 and 8, the convexity coupling means 30 and the concavity coupling means 40 are provided with coupling ridges 31 formed as male threads and coupling furrows 41 formed as female threads, and thus are screwed to connect the reinforced concrete watertight pipe to another reinforced concrete watertight pipe in series. Here, when the reinforced concrete watertight pipes are connected in series, a watertight ring 70 is fitted into one of ring insertion grooves 71 formed in outer ends of the convexity coupling means 30 and the concavity coupling means 40 that are opposite to each other. The watertight ring 70 is formed of an elastic material, and has slightly larger dimensions than the ring insertion groove 71. Then, the reinforced concrete watertight pipe to be connected is turned, and thus the watertight ring 70 is fitted into the other ring insertion groove 71, and is compressed in a turning direction. Thereby, the watertightness is enhanced at the joint.

Meanwhile, conventional reinforced concrete pipes connected in a socket or collar type have been easily deformed at their joint by, for instance, vibration, so that the leakage of water occurs. In contrast, the connecting construction of the convexity coupling means 30 and the concavity coupling means 40 is not susceptible to deformation or separation, so that the leakage of water does not occur, which results in excellent vibration resistance.

Figure 9:
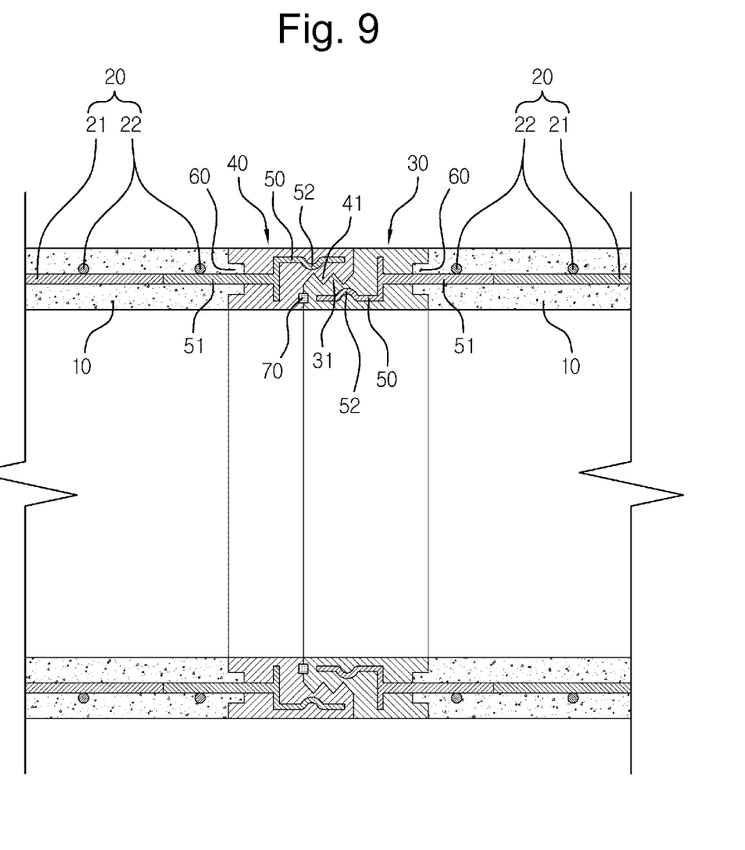

Each component for this construction will be described in greater detail. As illustrated in FIG. 8, the convexity coupling means 30 and the concavity coupling means 40 formed of a high-strength synthetic resin or a recycled synthetic resin are provided therein with metal cores 50, each of which reinforces vibration resistance, durability, or strength, so as to be able to withstand a tremendous concentrated load such as soil pressure above the reinforced concrete watertight pipe, loads of vehicles, and the dead load of the pipe. To further reinforce the strength of the core 50, the core 50 may be provided with a rib 52, as illustrated in FIG. 9.

Figure 5:
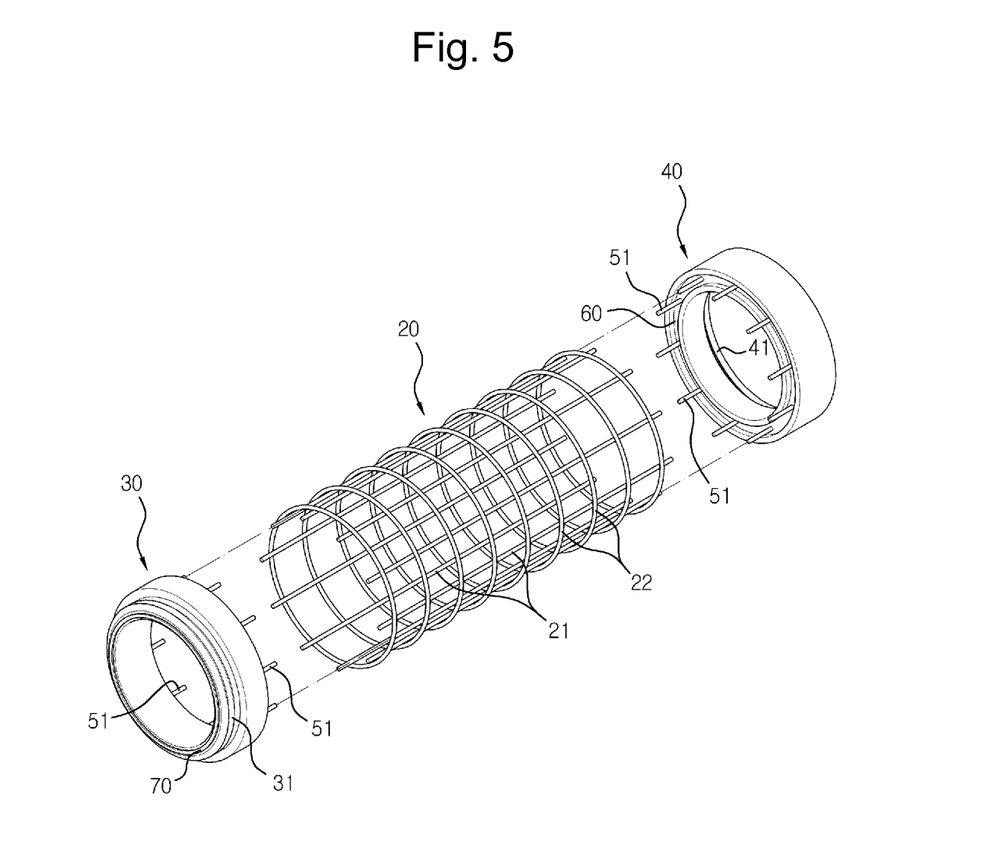
FIG. 5 is a disassembled perspective view illustrating a vibration-resistant reinforced concrete watertight pipe according to an exemplary embodiment of the present invention.
Figure 6:
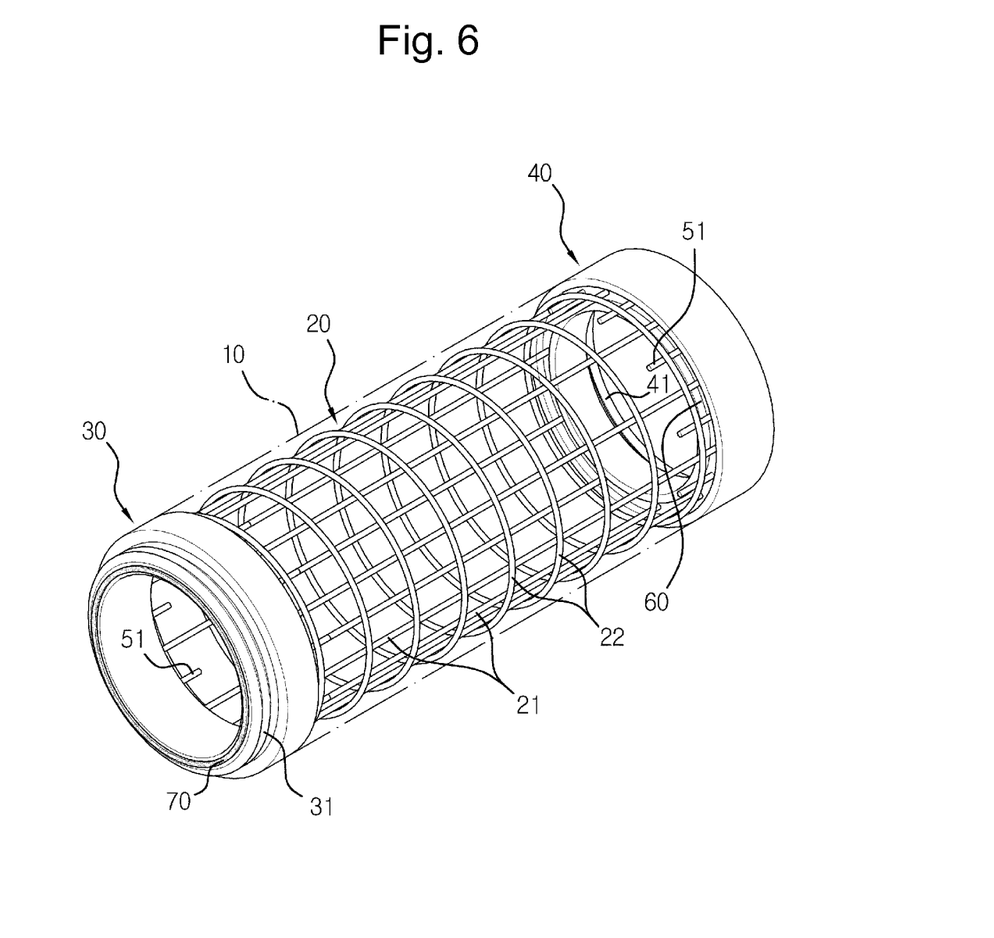
FIG. 6 is an assembled view illustrating a vibration-resistant reinforced concrete watertight pipe according to an exemplary embodiment of the present invention.

Further, as shown in FIG. 5, the core 50 is integrally formed with extension bars 51, each of which protrudes outwardly from the core 50 and is formed of the same metal material as the core 50, so as to be able to form the reinforced concrete watertight pipe by directly connecting the core 50 having such strength to the reinforced concrete pipe 10. Then, as shown in FIG. 6, the extension bars 51 are welded to the reinforcement mat 20 of the reinforced concrete pipe 10. Thereby, the convexity coupling means 30 and the concavity coupling means 40 can be connected to the reinforced concrete pipe 10. Here, as shown in FIG. 8, each of the convexity coupling means 30 and the concavity coupling means 40 may be additionally provided with a recess 60 in an inner end face thereof in which concrete poured when the reinforced concrete pipe 10 is formed is filled to increase connectability and watertightness.

Figure 10:
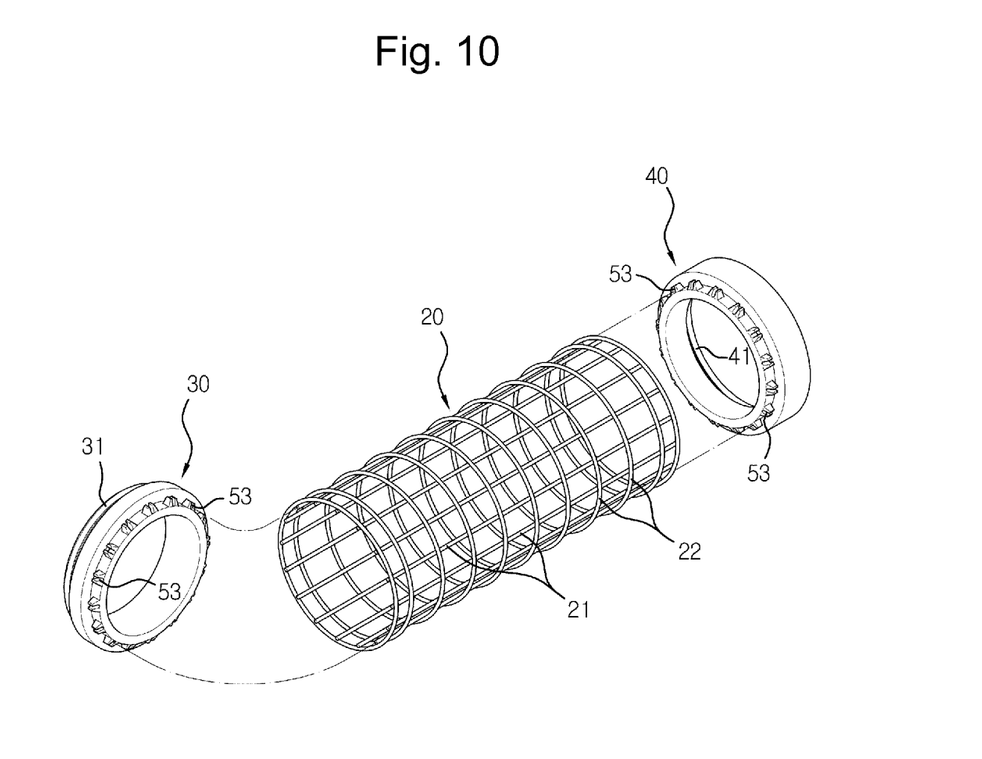
FIG. 10 is a disassembled perspective view illustrating a method of fixing a reinforcement mat in a vibration-resistant reinforced concrete watertight pipe according to another exemplary embodiment of the present invention.

Further, as shown in FIG. 10, each of the convexity coupling means 30 and the concavity coupling means 40 formed of a high-strength synthetic resin or a recycled synthetic resin is provided with anchors 53 at an inner end thereof to fasten it to the reinforcement mat 20. The convexity coupling means 30 and the concavity coupling means 40 can be assembled, so as not to be separated from the reinforcement mat 20, in such a manner that the transverse reinforcements 22 located at opposite ends of the reinforcement mat 20 are fitted into gaps between a body of the convexity coupling means 30 and the anchors 53 and between a body of the concavity coupling means 40 and the anchors 53 and then are fastened to the anchors 53 by, for instance, welding, or perhaps each longitudinal reinforcement 21 is fitted into a groove of each anchor 53 and then is fastened to each anchor 53 by, for instance, welding.

Figure 11:
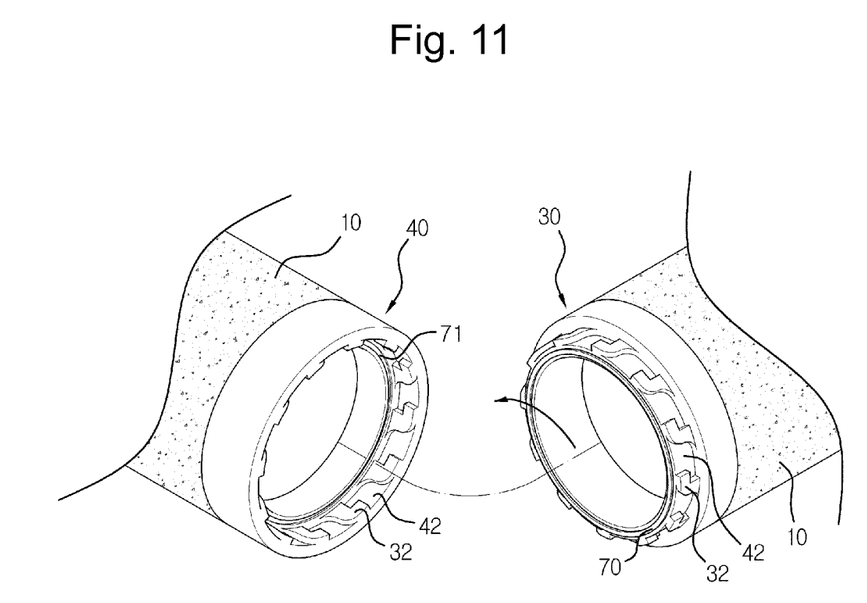
FIG. 11 is a perspective view illustrating a vibration-resistant reinforced concrete watertight pipe according to another exemplary embodiment of the present invention.

The convexity coupling means 30 and the concavity coupling means 40 may be connected to each other by screwing as described above. As another example, as shown in FIG. 11, the convexity coupling means 30 is provided with protrusions 32 and grooves 42 that are alternately formed at regular intervals at an outer end thereof instead of the coupling ridges 31, and the concavity coupling means 40 is also provided with protrusions and grooves 42 that are alternately formed at regular intervals at an outer end thereof instead of the coupling furrows 41. Thus, when the convexity coupling means 30 is inserted into and turned in the concavity coupling means 40, the protrusions 32 are engaged with the grooves 42. In this manner, after the convexity coupling means 30 is inserted into the concavity coupling means 40, the reinforced concrete watertight pipe to be connected is turned in one direction, so that the reinforced concrete watertight pipes can be connected in series.

Figure 12:
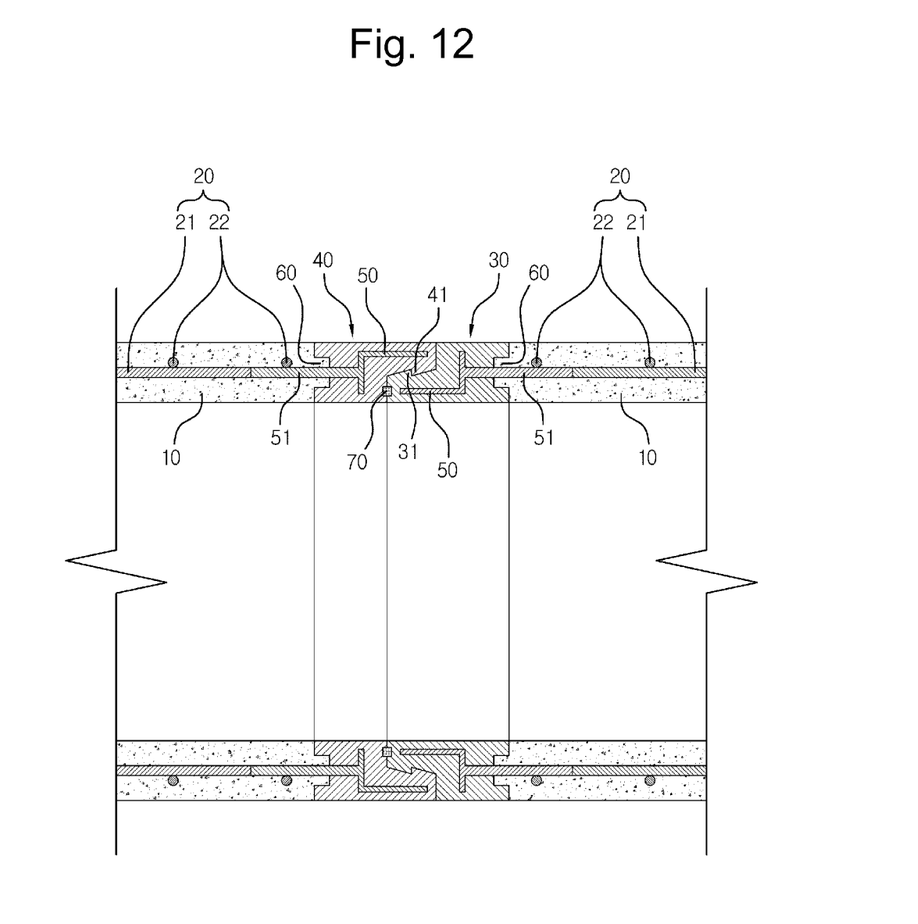
FIG. 12 is a cross-sectional view illustrating a vibration-resistant reinforced concrete watertight pipe according to yet another exemplary embodiment of the present invention.

Further, as shown in FIG. 12, the coupling ridges 31 of the convexity coupling means 30 and the coupling furrows 41 of the concavity coupling means 40 are modified so as to be directly connected by a method other than the turning method. To this end, each of the convexity coupling means 30 and the concavity coupling means 40 is provided with a wedged ring 32 and a recessed ring 42 that are formed at an outer end thereof. When the reinforced concrete watertight pipe to be connected is pushed in the direction opposite the connecting direction, or is pulled on the side of the reinforced concrete watertight pipe that has been connected, the convexity coupling means 30 is inserted into the concavity coupling means 40, and thus the wedged ring 32 is engaged to the counterpart recessed ring 42. Thereby, the convexity coupling means 30 and the concavity coupling means 40 can be directly connected.

Figure 13:
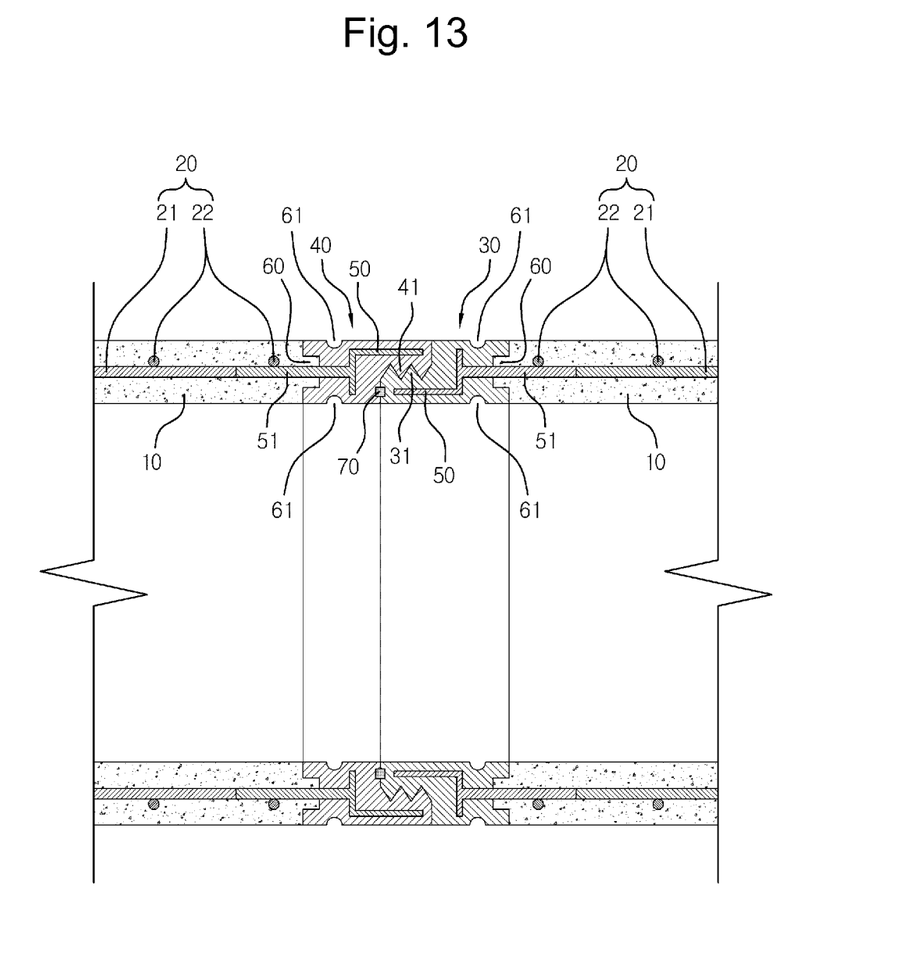
FIG. 13 is a cross-sectional view illustrating buffer grooves in a vibration-resistant reinforced concrete watertight pipe according to an exemplary embodiment of the present invention.

Furthermore, as shown in FIG. 1, with respect to the construction of a conventional reinforced concrete pipe that is a rigid structure, when the reinforced concrete pipe is subjected to minute changes in linearity or flexure due to differential settlement, stress concentrates on a joint edge, and thus a watertight ring becomes deformed resulting in water leaking, or the joint edge is subjected to cracks and damage, and thus watertightness deteriorates. As such, as shown in FIG. 13, the convexity coupling means 30 and the concavity coupling means 40, which are formed of a synthetic resin as a material that has higher resistance to brittleness and better flexibility than the rigid reinforced concrete, are each provided with buffer grooves 61 having the shape of a continuous ring in inner and outer circumferences thereof, so that they can be prevented from being deformed by shocks, concentrated stress, or flexure of the joint.

A method of manufacturing a vibration-resistant reinforced concrete watertight pipe according to an exemplary embodiment of the present invention includes: a process of preparing a reinforced concrete pipe 10, which includes a process of installing a form around a reinforcement mat 20 having longitudinal reinforcements 21 and transverse reinforcements 22, a process of injecting a predetermined quantity of concrete into the form, a process of heating and rotating the entire form to cure the concrete with the reinforcement mat 20 held in place by centrifugal force, and a process of complementarily finishing joints of opposite ends of the reinforced concrete pipe; a process of forming convexity coupling means 30 and the concavity coupling means 40, which includes a process of inserting metal cores 50 into respective synthetic resin molds, a process of filling a fused resin into a cavity of each synthetic resin mold under high pressure, and a process of cooling the resin and removing each mold; and a process of fixing the convexity coupling means 30 and the concavity coupling means 40 to opposite ends of the reinforcement mat 20. After the process of forming a convexity coupling means and a concavity coupling means and the process of fixing the convexity coupling means and the concavity coupling means are performed, the form installing process and the curing process similar to those used in the process of preparing the reinforced concrete pipe 10 are sequentially performed, wherein the form installing process includes surrounding the reinforcement mat 20, which is fixed to the convexity coupling means 30 and the concavity coupling means 40, with another mold.

Alternatively, the vibration-resistant reinforced concrete watertight pipe may be manufactured by a process of fixing extension bars 51 of each metal core 50 to the reinforcement mat 20 protruding toward opposite ends of the reinforced concrete pipe 10 manufactured by sequentially performing the form installing process and the curing process as in the conventional method, and a process of forming the convexity coupling means 30 and the concavity coupling means 40, which includes a process of installing a mold for forming the coupling means 30 and 40 so as to surround the cores 50 and the opposite ends of the reinforcement mat 20 and to enable the pipes to be connected in series, a process of filling a fused resin into a cavity of the mold under high pressure, a process of cooling the resin, and a process of removing the mold.

Here, the fixing process may be made up of a process of tying the extension bars 51 protruding outwardly from the cores 50 to the opposite ends of the reinforcement mat 20 with steel wires or coupling the extension bars 51 and the reinforcement mat 20 by spot welding so as to fix the convexity coupling means 30 and the concavity coupling means 40 to the reinforcement mat 20, as shown in FIGS. 4 through 6, and a process of inserting the transverse reinforcements 22 at the opposite ends of the reinforcement mat 20 into gaps between the anchors 53 and the convexity coupling means 30 and the concavity coupling means 40, or fitting each longitudinal reinforcement 21 into a groove of each anchor 53, as in shown in FIG. 10.

The vibration-resistant reinforced concrete watertight pipes manufactured in this way are transported to a construction site. Then, the watertight pipes are placed such that the convexity coupling means 30 and the concavity coupling means 40 are opposite to each other, and are connected by turning one of them. Thereby, the watertight pipes can be easily constructed and used as sewer pipes. Particularly, the method of connecting the watertight pipes can be visually checked, and after making the connection, the position of the watertight pipes cannot be changed.

The invention claimed is:

1. A vibration-resistant reinforced concrete watertight pipe comprising:
 a reinforced concrete pipe having a reinforcement mat, which is assembled with longitudinal reinforcements and transverse reinforcements, disposed in a concrete layer; and
 a coupling means made up of a convexity coupling means and a concavity coupling means that are coupled to opposite ends of the reinforced concrete pipe and have coupling ridges and coupling furrows respectively,
 wherein the convexity coupling means and the concavity coupling means coupled to the opposite ends of the reinforced concrete pipe are formed of a synthetic resin having physical properties different from those of the reinforced concrete pipe, and have shape and thickness identical to those of the reinforced concrete pipe,
 each of the convexity coupling means and the concavity coupling means has a metal core, an end of which is bent in an "L" shape, installed therein to reinforce strength so as to be able to withstand soil pressure, loads of vehicles, and a dead load of the pipe, and extension bars that integrally protrude from the metal core and are formed of the same metal material as the metal core so as to be able to be connected to a bent vertical part of the metal core and the reinforcement mat by welding, or anchors into which the reinforcement mat is fitted and assembled;
 each of the convexity coupling means and the concavity coupling means includes a recess formed in an inner end face thereof which is connected with the reinforced concrete pipe, the recess being filled with concrete when the pipe is formed to increase connectability and watertightness; and
 each of the convexity coupling means and the concavity coupling means includes ring-shaped buffer grooves that are formed in inner and outer circumferences thereof and prevent the coupling means from being deformed by shocks, concentrated stress, or flexure of a joint.

2. The vibration-resistant reinforced concrete watertight pipe as set forth in claim 1, wherein the coupling ridges of the convexity coupling means and the coupling furrows of the concavity coupling means are formed as male threads and female threads respectively, and are coupled by screwing.

3. The vibration-resistant reinforced concrete watertight pipe as set forth in claim 1, wherein the coupling ridges of the convexity coupling means and the coupling furrows of the concavity coupling means are each formed as protrusions and grooves at regular intervals, and are engaged and coupled by turning.

4. The vibration-resistant reinforced concrete watertight pipe as set forth in claim 1, wherein the coupling ridges of the convexity coupling means and the coupling furrows of the concavity coupling means are each formed as a wedged ring and a recessed ring so as to be directly connected to each other, and are engaged and coupled by linear insertion.

5. The vibration-resistant reinforced concrete watertight pipe as set forth in claim 1, wherein the metal core includes a rib.

6. The vibration-resistant reinforced concrete watertight pipe as set forth in claim 1, wherein each of the convexity coupling means and the concavity coupling means includes a ring insertion groove in an outer end face thereof into which a watertight ring is fitted, and the watertight ring is formed of an elastic material, has slightly larger dimensions than the ring insertion groove, and is compressed in a direction in which the convexity coupling means and the concavity coupling means are coupled to each other.

7. A method of manufacturing a vibration-resistant reinforced concrete watertight pipe comprising:
 a process of preparing a reinforced concrete pipe by sequentially performing a process of installing a form around a reinforcement mat having longitudinal reinforcements and transverse reinforcements, a process of injecting concrete into the form, and a process of heating and rotating the entire form to cure the concrete with the reinforcement mat held in place by a centrifugal force;
 a process of forming a convexity coupling means and a concavity coupling means, which includes a process of inserting metal cores, which reinforces strength so as to be able to withstand soil pressure, loads of vehicles, and a dead load of the pipe, into respective molds;
 a process of filling a fused resin into a cavity of each mold under high pressure such that extension bars integrally protrudes from a vertical part of each metal core bent in an "L" shape and are fixed to the reinforcement mat by welding, such that a recess is formed in an inner end face of each of the convexity coupling means and the concavity coupling means which is connected with the reinforced concrete pipe and is filled with concrete when the pipe is formed so as to increase connectability and watertightness, and such that ring-shaped buffer grooves are formed in inner and outer circumferences of each of the convexity coupling means and the concavity coupling means and prevent the coupling means from being deformed by shocks, concentrated stress, or flexure of a joint, and a process of cooling the resin and removing each mold;
 a process of fixing the extension bars integrally protruding for the vertical parts of the metal cores, bent in the "L" shape, of the convexity coupling means and the concavity coupling means to opposite ends of the prepared reinforcement mat by welding or fitting and fixing the reinforcement mat into and to anchors of the convexity coupling means and the concavity coupling means; and
 a process of sequentially performing a process of installing another form around the fixed result and another curing process similar to the process used to prepare the reinforced concrete pipe.

8. The method as set forth in claim 7, wherein the fixing process welds the extension bars, which integrally protrude from the vertical part of the metal core bent in the "L" shape, to opposite ends of the reinforcement mat by spot welding so as to fix the convexity coupling means and the concavity coupling means to the reinforcement mat.

9. The method as set forth in claim 7, wherein the coupling means is formed of a high-strength synthetic resin or a recycled synthetic resin.

* * * * *